UNITED STATES PATENT OFFICE.

JOHN C. TALIAFERRO, OF BALTIMORE, MARYLAND, ASSIGNOR TO EDWIN NORTON, OF MAYWOOD, AND OLIVER W. NORTON, OF CHICAGO, ILLINOIS.

PROCESS OF REDUCING TIN OXID OR DROSS TO PURE METALLIC TIN.

SPECIFICATION forming part of Letters Patent No. 616,161, dated December 20, 1898.

Application filed July 7, 1898. Serial No. 685,368. (No specimens.)

*To all whom it may concern:*

Be it known that I, JOHN C. TALIAFERRO, a citizen of the United States, residing in Baltimore, in the State of Maryland, have invented a new and useful Improvement in the Art or Process of Reducing Tin Oxid or Dross to Pure Metallic Tin, of which the following is a specification.

My invention relates to improvements in the art of recovering or reducing back to pure metallic tin the tin oxid or dross which is produced in tinning or other operations.

In the practical manufacture of tin-plate a considerable amount of tin oxid or dross is always produced, the same requiring to be skimmed off from time to time from the top of the molten tin in the tinning pots or vessels. This tin oxid or dross has heretofore resulted in a good deal of waste and adds materially to the cost or expense of manufacturing tin-plate. The process or method heretofore generally employed for reducing the dross or tin oxid or recovering the pure tin therefrom has consisted, essentially, in subjecting it to the action of reverberatory furnaces; but this process is attended with a good deal of expense and considerable waste, as the tin in part escapes and goes up the chimney in the form of vapor in the high heat necessarily employed.

The object of my invention is to provide a simple and inexpensive means or process of reducing tin oxid or dross to pure metallic tin and without waste. I have discovered that this important object or new result may be accomplished by subjecting tin oxid or dross to the action of stearic acid or other fat acid and a comparatively low degree of heat, preferably that of molten tin.

In practicing my invention I place the oxid or dross in a suitable pot or vessel partly filled with molten tin, the vessel being subjected to a slow heat to keep the tin in a molten condition, the molten tin thus serving to impart the requisite degree of heat to the tin oxid or dross, and then cover the oxid or dross with a fatty acid, preferably stearic acid, which, in connection with the heat, causes the tin oxid or dross to be reduced or returned to pure metallic tin, while at the same time the fatty acid covering the dross and tin prevents further oxidation during the process by excluding air from the surface of the molten metal. The length of time required in the process or for the fatty acid and heat to reduce the tin oxid or dross back to pure metallic tin is ordinarily only a few minutes, and the process is carried on without any waste or loss of material. The process is exceedingly cheap or inexpensive, as the only cost is that of the fuel required to maintain the slow heat necessary to keep the tin in a molten condition.

My process may also be used in recovering or reducing solder, dross, or oxid, or the dross or oxid produced from other alloys of tin, and also in reducing lead dross to metallic lead.

I claim—

1. The process or improvement in the art of recovering or reducing tin oxid or dross to metallic tin, consisting in collecting quantities of the oxid or dross from tinning-pots or other sources and subjecting it to the action of fatty acid and a low heat in the presence of molten metallic tin, substantially as specified.

2. The process or improvement in the art of recovering or reducing tin oxid or dross to metallic tin, consisting in collecting quantities of the oxid or dross from tinning-pots or other sources, and subjecting it to the action of stearic acid and a low heat in the presence of molten metallic tin, substantially as specified.

3. The process of reducing metallic oxid or dross of soft metals, such for example as tin, lead or alloys thereof, consisting in collecting the oxids or dross in quantities from tinning-pots or other sources and subjecting them to the action of a fatty acid and a low degree of heat in the presence of molten metal of the kind to be recovered, substantially as specified.

JOHN C. TALIAFERRO.

Witnesses:
L. BRUCE MOORE,
WM. W. CLOUD.